United States Patent [19]

Itatani

[11] Patent Number: 5,200,449
[45] Date of Patent: Apr. 6, 1993

[54] POLYIMIDE RESIN AND PREPARATION THEREOF

[75] Inventor: Hiroshi Itatani, Chiba, Japan

[73] Assignee: W. R. Grace & Co.-Conn., New York, N.Y.

[21] Appl. No.: 697,122

[22] Filed: May 8, 1991

[51] Int. Cl.$^5$ .......................... C08J 3/09; C08K 5/13; C08L 77/06
[52] U.S. Cl. ..................................... 524/323; 524/514
[58] Field of Search ................................. 524/323, 514

[56] References Cited

U.S. PATENT DOCUMENTS 4,290,936  9/1981  Sasaki et al. ........................ 524/879
4,568,715  2/1986  Itatani et al. ........................ 524/348

FOREIGN PATENT DOCUMENTS 50-113597  9/1975  Japan .
54-10338   1/1979  Japan .
58-79018   5/1983  Japan .
61-45652  10/1986  Japan .
64-1494    1/1989  Japan .
64-5603    3/1989  Japan .

Primary Examiner—Paul R. Michl
Assistant Examiner—U. K. Rajguru
Attorney, Agent, or Firm—Valerie E. Looper

[57] ABSTRACT

A polyimide resin composition with outstanding heat resistance and mechanical properties is disclosed, along with a novel method of its preparation. A tetracarboxylic acid or its derivative and an aromatic diamine are dissolved in a solvent system of mixed phenols and are both polymerized and imidized on one step.

5 Claims, No Drawings

POLYIMIDE RESIN AND PREPARATION THEREOF

FIELD OF THE INVENTION

This invention relates to polyimide resins with outstanding heat resistance and mechanical properties, and also to a novel method of preparing such compositions. According to this invention, a tetracarboxylic acid or its derivative, and an aromatic diamine are dissolved in a phenolic solvent mixture and then are both imidized and polymerized at a high temperature in one step. A highly concentrated polyimide solution can be obtained in this manner, and this solution can be easily formed into a film useful for fluid separations. The phenolic solvent system is safer to use than the halogenated phenols which have been used in the past. The one-step reaction is simpler and less costly than a comparable two-step reaction. As a result, this invention has considerable commercial utility because it is both economical and less environmentally demanding than the manufacturing methods which have been used.

BACKGROUND OF THE INVENTION

Polyimide resins that contain pyromellitic anhydrides [1,2,4,5-benzene tetracarboxylic dianhydrides] as the main component have only limited solubility in a majority of solvents. As a consequence, a two-step method of preparation is currently in use. In that method, nearly equal mols of acid dianhydride and aromatic diamine are added in a polar solvent such as N-methylpyrrolidone ("NMP") or dimethylformamide and so on and reacted at room temperature or a lower temperature to obtain a high molecular weight polyamic acid solution. The polyamic acid solution is then cast on a substrate sheet. The sheet is then chemically treated or heated, to form a polyimide.

A one-step polymerization reaction by direct imidization of acid dianhydride and aromatic diamine would greatly simplify preparation of the polyimide, and help bridge the gap between a laboratory preparation method and a commercial manufacturing process.

It is known that certain kinds of polyimide 0 resins, those that contain biphenyl tetracarboxylic dianhydride or benzophenone tetracarboxylic dianhydride as the main component, can be made by a one-step polycondensation method which does not go through the high molecular weight polyamic acid. These methods depend on the resin's solubility in a specific solvent system.

Japanese Kokai Patent SHO 50-113597 (1975) describes a method for preparation of solvent-soluble type polyimides by reacting nearly equal mols of a diamine component and a tetracarboxylic acid component containing mainly biphenyl-3,4,3',4'-tetracarboxylic acids or 2,3,3',4'-biphenyl tetracarboxylic acids in a para-chlorophenol solvent system.

In Japanese Kokai Patent SHO 64-5603 (1989) and Japanese Patent SHO 61-45652 (1986), nearly equal mols of tetracarboxylic dianhydride and aromatic diamine are used and heated in para-chlorophenol, to obtain a polyimide resin composition which is dissolved in the halogenated phenol by one-step polycondensation reaction. And, in Japanese Kokoku Patent SHO 64-14994 (1989), 2,5-di(4-aminophenyl)-3,4-diphenyl thiophene is used as the aromatic diamine to react with benzophenone tetracarboxylic dianhydride, to obtain a polyimide resin composition which is soluble in m-cresol. In Japanese Kokai Patent SHO 54-10338 (1979), 4,4'-diamino-dicyclohexyl methane and tetracarboxylic dianhydride are heated in m-cresol at 50°-160° C., to obtain a polyimide resin composition directly. In Japanese Kokai Patent SHO 58-79018 (1983),dimethyl benzhydrol-3,3',4,4'-tetracarboxylate as the acid component and bis(4-amino-phenyl) methane are heated at 170° C. in m-cresol, to obtain a polyimide resin that is dissolved in m-cresol.

Because the halogenated phenols being used in the above examples have potent toxicity, it is necessary to have a well-prepared working environment to prevent its dissipation. Therefore, there is a demand for a solvent or solvents that have lower toxicity than halogenated phenols and can dissolve the polyimides. The drawback of using solvents such as m-cresol, xylenol, and so on, is that these solvents cannot dissolve the polyimides of the present invention.

SUMMARY OF THE INVENTION

An object of this invention is to provide a safer solvent to replace the highly toxic solvents such as halogenated phenols in the formation of a polyimide solution that can be used for preparation of certain polyimide films, i.e., those that have excellent chemical and mechanical properties by using a one-step reaction involving nearly equal mols of tetracarboxylic acid components and aromatic diamine components.

As a result of extensive investigation to solve the aforementioned problems, the present inventors have discovered that a homogeneous, clear, and highly concentrated polyimide resin composition can be prepared by running a one-step polymerization/imidization reaction of a specific tetracarboxylic acid component and diamine component in a solvent mixture made of (a) phenol and (b) at least one kind of phenol selected from the group of phenols substituted by one hydroxy group, phenols substituted by one or two lower alkyl groups, or phenols substituted by one or two lower alkoxy groups. These solvent systems have never been used in the production of such polyimide resin compositions. Based on this discovery, the present inventors have finally perfected this invention.

Thus, another object of this invention is to provide a polyimide resin composition, where a polyimide resin containing more than 60% by weight of repeating unit represented by the general formula

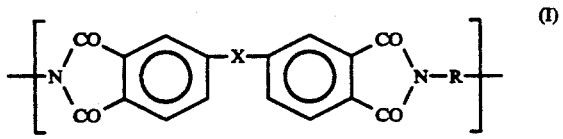

[where, R is a residue group of an aromatic diamine from which the amino group has been removed, and X is a carbon-carbon bond, O, $SO_2$, CO or $CF_3-C-CF_3$]

is dissolved in a solvent mixture comprising (a) phenol, and (b) at least one kind of phenol selected from a group comprising phenols substituted by one hydroxy group, phenols substituted by one or two lower alkyl groups, and phenols substituted by one or two lower alkoxy groups.

Yet another object of this invention is to provide a method of preparing the polyimide resin compositions described above, those characterized by using substantially equal mols of a tetracarboxylic acid component where the tetracarboxylic acid is represented by the general formula II

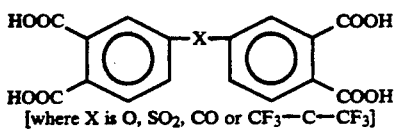

[where X is O, SO$_2$, CO or CF$_3$—C—CF$_3$]

or its derivative is the major component and an aromatic diamine to run a reaction at 120°–250° C. in a solvent mixture comprising (a) phenol and (b) at least one kind of phenol selected from the group of phenols substituted by one hydroxy group, phenols substituted by one or two lower alkyl groups, or phenols substituted by one or two lower alkoxy groups, removing the formed water as an azeotropic mixture, and carrying out both the polymerization and the imidization reactions in one step.

Furthermore, this invention is a method for preparing a polyimide resin composition using substantially equal mols of an aromatic diamine component and a tetracarboxylic acid component containing 3,3',4,4'-biphenyl tetracarboxylic acid as its major component. The reaction is run at a temperature of about 100°–250° C. in a mixed phenolic solvent. The weight ratio of phenol and 4-methoxyphenol is 4:6–7:3 or the weight ratio of phenol and 2,6-dimethyl phenol is 4:6–6:4. Formed water is removed as an azeotropic mixture, to polymerize and imidize the tetracarboxylic acid component and the aromatic diamine component in one step, so that the formed polyimide resin dissolves in the mixed solvent.

The polyimide obtained by the method of this invention is a polymer that has the ratio of imidization higher than 90%, preferably higher than 95%, and more preferably higher than 98%, and logarithmic viscosity (measured at 30° C. at concentration 0.5 g/100 ml in NMP solvent) of about 0.2–4.

The polyimide solution obtained by the method of this invention can be used to make the desired polyimide film having outstanding mechanical properties easily, by forming a thin film from the solution and subsequently removing the solvent from the thin film by evaporation. This polyimide film has an excellent tensile strength (strength at rupture) of at least 10 kg/mm$^2$.

And, with the method of this invention, a homogeneous and clear polyimide solution of various concentrations can be obtained at a polyimide concentration of up to 30% by weight, particularly 5–25% by weight. The polyimide solution also has excellent storage stability without separation of polymer from the solution to form haze or a precipitate, even after a long period of storage. And, the polyimide solution can be diluted freely to a variety of concentrations by using the aforementioned solvent mixtures. It may also be concentrated, for example, by evaporation of the solvent.

Other objects of this invention will become clear to those of ordinary skill in the art through the further disclosure herein.

DETAILED DESCRIPTION OF THE INVENTION

The tetracarboxylic acid component to be used in the method of this invention has to contain the tetracarboxylic acid represented by the aforementioned formula (II) or its derivatives, such as its acid anhydride or its esterified products or their mixture, in an amount of more than about 80 mol %, preferably 90–100 mol %, based on the total amount of tetracarboxylic acid components. Dianhydrides of the tetracarboxylic acid represented by the aforementioned formula (II) are particularly suitable to serve as the tetracarboxylic acid or its derivative.

Examples of the tetracarboxylic acids represented by the aforementioned formula (II) are 3,3',4,4'-benzophenone tetracarboxylic acid, 2,2-bis(3,4-dicarboxyphenyl) hexafluoropropane, bis(3,4-dicarboxyphenyl) ether, bis(3,4-dicarboxyphenyl) ether, and bis(3,4-dicarboxyphenyl) sulfone. It is particularly desirable to use the dianhydrides of these compounds as the main component of the tetracarboxylic acid component.

Examples of other tetracarboxylic acids that can be used are biphenyl-2,3,3',4'-tetracarboxylic acid; biphenyl-2,3,2',3'-tetracarboxylic acid; benzophenone-2,3,2',3'-tetracarboxylic acid; bis(3,4-dicarboxyphenyl)methane; bis(3,4-dicarboxyphenyl) thioether; bis(3,4-dicarboxyphenyl)thioether; 2,3,6,7-naphthalene tetracarboxylic acid; and 1,2,4,5-benzenetetracarboxylic acid ("pyromellitic acid"). Particularly, the tetracarboxylic dianhydrides can be mentioned as the favored examples.

In the method of this invention, the amount of the tetracarboxylic acid component or its derivative described above should be at least 60 mol % of the total tetracarboxylic acid component, to facilitate formation of the polyimide film. Also, unless the minimum amount is used, a polymer may precipitate during the polyimidization reaction, the reaction mixture may become turbid and opaque, and high molecular weight polymer solution may not be obtained, or the polymer may separate and precipitate from the reaction mixture after completion of the polyimidization reaction and upon cooling the reaction mixture.

The aromatic diamine component to be used in the method of this invention can be represented by general formulas I, II, III, and IV.

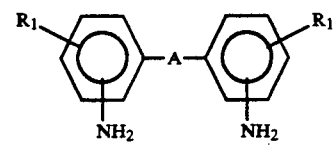

I

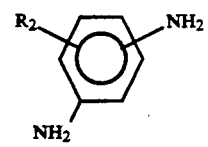

II

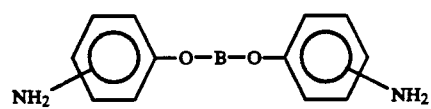

III

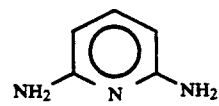

IV

Here, R$_2$ and R$_2$ are hydrogen, lower alkyl groups, carboxyl group, halogens, sulfonic acid or lower alkoxyl group; and A is either absent, or —S—, —O—,

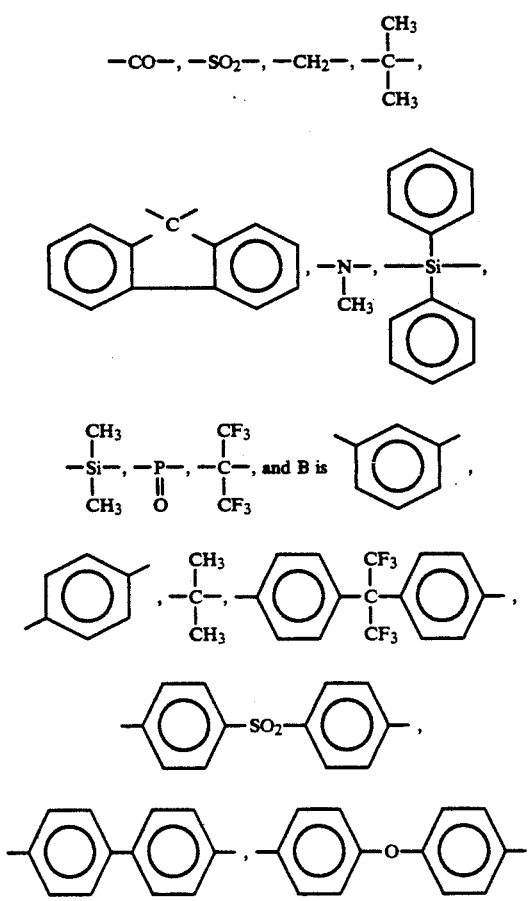

Diamines represented by the following general formula, $$H_2N-R-NH_2$$

[where R represents a divalent organic group] such as 4,4'-bis(4-aminophenoxy)biphenyl; 4,4'-diaminodiphenylsulfone; 3,3'-diaminodiphenylsulfone; bis[4-(4-aminophenoxy)phenyl]sulfone; bis[4-(3-aminophenoxy)phenyl]sulfone; bis[4-(2-aminophenoxy) phenyl]sulfone; 1,4-bis(4-aminophenoxy)benzene; 1,3-bis(4-aminophenoxy)benzene; 1,3-bis(3-aminophenoxy) benzene; bis[4-(4-aminophenoxy)phenyl]ether; bis(3-ethyl-4-aminophenyl]methane; bis(3-methyl-4-aminophenyl)methane; 4,4'-diaminodiphenylmethane; 3,3'-diaminodiphenylsulfone; 4,4'-diaminodiphenylsulfone; 2,2',5,5'-tetrachloro-4,4'-diaminobiphenyl; 4,4'-diaminodiphenylsulfide; 3,3'-diaminodiphenylether; 4,4'-diaminodiphenylether; 2,2',3,3',5,5',6,6'-octafluoro-4,4'-diaminobiphenyl; 2,4-diaminotoluene; 1,3-diaminobenzene; 1,4-diaminobenzene; 2,2-bis[4-(4-aminophenoxy)phenyl]propane; 2,2-bis[4-(4-aminophenoxy)phenyl]hexafluoropropane; 2,2-bis(4-aminophenyl)propane; 2,2-bis(4-aminophenyl)hexafluoropropane; 2,2-bis(3-hydroxy-4-aminophenyl)propane; 2,2-bis(3-hydroxy-4-aminophenyl)hexafluoropropane; 3,3'-dimethyl-4,4'-diaminobiphenyl; 2,6-diaminopyridine; 4,4'-diaminobiphenyl-6,6'-disulfonic acid; 3,3'-dimethyl-4,4'-diaminobiphenyl-6,6'-disulfonic acid; 9,9-bis(4-aminophenyl)fluorene; 9,9-bis(4-aminophenyl)-10-hydroanthracene; 3,3'-diaminobenzophenone; and 3,4'-diaminobenzophenone and so on, can be mentioned as the examples of aromatic diamine components that can be used in the method of this invention. Or, some of the polyvalent amines, such as 3,3,4,4'-tetraaminodiphenyl ether and so on, may be used.

Although, in the method of this invention, the aforementioned tetracarboxylic acid component and the aromatic diamine component are used in near equivalent mol ratio to carry out a one-step polyimidization reaction, the amounts of the two components being used do not have to be perfectly equal. Thus, a high molecular weight polyimide can be obtained if one component is within 5 mol %, particularly within 2 mol % of that of the other component.

Examples of the phenolic solvent mixture, in other words the solvent mixture of (a) phenol and (b) at least one kind of phenol selected from a group comprising phenols substituted by one hydroxy group, phenols substituted by one or two lower alkyl groups, and phenols substituted by one or two lower alkoxy groups, to be used as the solvent in this invention are solvent mixtures such as phenol/4-methoxy-phenol, phenol/2,6-dimethyl-phenol, phenol/resorcinol, phenol/4-methoxyphenol/resorcinol or phenol/2,6-dimethyl-phenol/resorcinol. These solvent mixtures were discovered by examining the results of experiments on numerous compounds, and the solvent mixtures show a particularly significant effect which could not be expected at all from each individual solvent. The melting point and boiling point, where known, of the individual solvents and of selected solvent mixtures are shown in the following Table 1. The effect of changing the mixing ratio of phenol/4-methoxy phenol, phenol/2,6-dimethyl phenol, or phenol/resorcinol, is shown in the following Table 2.

TABLE 1

| Composition | | Melting point (°C.) | Boiling point (°C.) |
|---|---|---|---|
| Phenol | | 40.9 | 181.6 |
| 4-Methoxy phenol | | 55–57 | 243 |
| 2,6-Dimethyl phenol | | 49.0 | 203 |
| Phenol/4-methoxy phenol | 7:3 | 15 | |
| Phenol/2,6-dimethyl phenol | 6:4 | 8 | |
| Resorcinol | | 109–110 | 276 |
| Phenol/resorcinol | 7:3 | 27 | |
| Phenol/4-methoxy phenol/ resorcinol | 7:3:3 | −2 | |
| Phenol/2,6-dimethyl phenol/ resorcinol | 6:4:3 | <−18 | |

In order for a solvent mixture to be useful in this invention, it must have the following characteristics:
(1) Liquid at room temperature, and capability to dissolve the formed polyimide.
(2) Inexpensive and readily available for commercial use.

TABLE 2

| Phenol (g) | 4-Methoxy-phenol (g) | Mixing condition (at room temp) |
|---|---|---|
| 100 | 0 | Crystal |
| 90 | 10 | Crystal |
| 80 | 20 | Semi-molten |
| 70 | 30 | Liquid |
| 60 | 40 | Liquid |
| 50 | 50 | Liquid |
| 40 | 60 | Liquid |
| 30 | 70 | Crystal |
| 20 | 80 | Crystal |
| 10 | 90 | Crystal |
| Phenol (g) | 2,6-Dimethyl-phenol (g) | Mixing condition (at room temp.) |
| 100 | 0 | Crystal |
| 90 | 10 | Crystal |

TABLE 2-continued

| | | |
|---|---|---|
| 80 | 20 | Crystal |
| 70 | 30 | Semi-molten |
| 60 | 40 | Liquid |
| 50 | 50 | Liquid |
| 40 | 60 | Liquid |
| 30 | 70 | Crystal |
| 20 | 80 | Crystal |
| 10 | 90 | Crystal |

| Phenol (g) | Resorcinol (g) | Mixing condition (at room temp.) |
|---|---|---|
| 100 | 0 | Crystal |
| 90 | 10 | Crystal |
| 80 | 20 | Crystal |
| 70 | 30 | Semi-molten |
| 60 | 40 | Semi-molten |
| 50 | 50 | Semi-molten |
| 40 | 60 | Semi-molten |
| 30 | 70 | Crystal |
| 20 | 80 | Crystal |
| 10 | 90 | Crystal |

(3) Low toxicity, and easy to handle.
(4) Easily recoverable by distillation, to yield polyimide film.
(5) The polyimide film obtained by removal of solvent by distillation As a result of an extensive investigation to find a solvent that can fulfill these conditions, the phenolic solvent mixtures of this invention were discovered.

Phenol, 4-methoxy-phenol, 2,6-dimethyl-phenol and resorcinol all have high melting points and are crystals at room temperature. When they are mixed appropriately, however, the mixture is liquid at room temperature, due to melting point depression. The phenol/4-methoxy-phenol mixed system is liquid at room temperature when the mixing ratio (by weight) is about 70/30–40/60. The phenol/2,6-dimethyl-phenol mixed system, is liquid at room temperature when the mixing ratio is about 60/40–40/60. And the phenol/resorcinol mixed system is in a semi-molten state at room temperature when the mixing ratio (by weight) is about 70/30–40/60. The phenol solvent mixtures listed above are able to dissolve the high molecular weight polyimides of the present invention.

Furthermore, the ternary solvent mixture prepared by adding 1–4 weight parts resorcinol to 10 weight parts of the phenol/4-methoxy-phenol mixture (weight ratio is about 70/30–40/60) is a liquid at room temperature. Particularly, the phenol/4-methoxyphenol/resorcinol mixture having a weight ratio of 7:3:3 has a melting point at −2° C., and it was found to dissolve the nearly insoluble high molecular weight polyimide resin. And, the ternary solvent mixture prepared by adding 1–4 weight parts resorcinol to 10 weight parts of the phenol/2,6-dimethyl-phenol mixture (weight ratio=60/40–40/60) is also a liquid at room temperature. And particularly, the phenol/2,6-dimethyl-phenol/resorcinol mixture having a weight ratio 6:4:3 had a melting point lower than −18° C., and was found to dissolve the nearly insoluble high molecular weight polyimide resin.

According to the experiments by the inventor of the present invention, when various xylenol isomers, cresol, nitrophenol, 4-hydroxybenzaldehyde, methyl-4-hydroxy benzoate and 4-hydroxy acetophenone and so on were tested instead of 4-methoxy phenol, 2,6-dimethyl phenol and resorcinol, they were found to be no better than the above-said solvent mixtures.

The aforementioned solvent mixtures of this invention are safer to use and less toxic than the halogenated phenolic compounds which are used conventionally in the aforesaid one-step polyimidization reaction. As a result, the equipment and process steps required for their use are less elaborate. Naturally, this safer solvent system is therefore of great commercial value.

By using the aforementioned solvent mixture in this invention, a homogeneous and clear polyimide solution can be obtained without precipitating the polymer, heterogenizing or opacifying the solution even when the tetracarboxylic acid represented by the aforementioned general formula II or its derivatives and various aromatic diamines are polyimidized at high concentrations in one step, and a polyimide film having outstanding physical characteristics can be prepared easily from the polyimide solution.

In the method of this invention, the tetracarboxylic acid component that contains the tetracarboxylic acid represented by the aforementioned general formula II or its derivatives such as acid anhydrides, esters or their mixture as its major component, and aromatic diamine component are used at near equal molar proportion. They are reacted at about 120°–250° C., preferably 140°–200° C., using the aforesaid solvent mixture as the reaction solvent. To prevent oxidation, it is desirable to run the reaction under an inert gas ($N_2$, Ar, He, etc.) atmosphere.

A promotor such as pyridine, triethylamine, N-methyl morpholine, or hexamethylene tetramine may be added to the reaction system, to complete the reaction quickly. At the same time the formed water is removed from the reaction system as an azeotropic mixture with xylene or toluene or a similar solvent added in minor amount. The tetracarboxylic acid component and aromatic diamine component are polyimidized, to form a polyimide solution.

In the aforesaid polyimidization reaction, if the reaction temperature is lower than 120° C., the polymer obtained by the polymerization of the aforesaid two components cannot be imidized thoroughly and it may contain a high proportion of amide-acid linkage besides the imide linkage. As a result, such a polymer may precipitate from the reaction mixture. Another result might be that the storage stability of the reaction mixture may turn poor. On the other hand, if the reaction temperature is higher than 250° C., the formed polymers may crosslink each other to form a gel, resulting in a polymer without fluidity or a heterogenous polymer solution.

While any method can be used to heat the reaction mixture, it is desirable, for example, to add each feedstock at room temperature to prepare a solution for the reaction and then raise the temperature of the reacting solution from room temperature to the reaction temperature over a period of about 0.2–5 hours, preferably 0.5–2 hours. It is desirable to keep the reaction mixture for the polyimidization reaction in the aforesaid reaction temperature range for about 1–10 hours, to run the polyimidization reaction. It is not necessary to maintain the reaction temperature at a certain constant level during the reaction. Rather, the reaction temperature may be varied within the aforementioned temperature range in any appropriate manner.

In the aforesaid polyimidization reaction, the total combined amount of each component except the solvent in the reacting solution is 3–40 weight %, preferably 5–25 weight %, in terms of concentration. Furthermore, in the polyimidization reaction, the reaction pressure may be either normal pressure, reduced pressure or raised pressure. Since phenol can be oxidized easily by air at high temperatures, it is desirable to run the reaction in an inert gas (N₂, Ar, He, etc.) atmosphere.

Various kinds of polyimide solutions obtained by the method of this invention are homogeneous, clear, viscous solutions which have a viscosity of about 500–2,000,000 centipoises (CP) at temperatures higher than room temperature. If this polyimide solution (polymer concentration about 10 weight %) is heated to about 50°–200° C., one can obtain a polyimide solution that has a viscosity suitable for preparation of a film, and thus a thin film can be formed easily from the polyimide solution. Therefore, if the solvent is removed completely from the thin film made from polyimide solution by evaporation, it is possible to prepare a polyimide film that has excellent properties.

The polyimide solution obtained by the method of this invention has a high imidization ratio, and contains a high concentration of high molecular weight polyimide represented by logarithmic viscosity. Since the polyimide can hardly depolymerize or crosslink in the range between room temperature and about 200° C., it can be stored for a long period of time in the aforesaid temperature range. It is storage stable for at least several months at temperatures less than 50° C.

The polyimide solution obtained by the method of this invention is suitable for film formation and is also useful for forming other shaped products. It can also be used as a varnish for cable lamination and as a heat-resistant adhesive and so on.

The polyimide resin composition obtained in this invention can be converted to powder form by pouring it into a solution such as alcohol, water/alcohol mixture, ketone, water/ketone mixture, alcohol/hydrocarbon mixture and so on, agitating, crushing and pulverizing.

The polyimide powder can be stored for a long period of time without change, and can be reconstituted. The polyimide powder also can be converted into formed products by a direct compression molding process, etc. Further, it may be dissolved in polar solvents such as NMP, etc. or a phenolic solvent mixture, to form a film by casting or be used as a varnish for enameled cables, if necessary.

Examples of this invention and Comparative Examples are illustrated below.

In the following description, inherent viscosity is defined as follows:

$$\text{Inherent viscosity } (\eta_{inh}) = \frac{\ln(t/t_o)}{0.5}$$

In the above equation, t is the falling velocity of the polymer solution (0.5 g of the sample was dissolved in 100 ml of NMP, and t· is the falling velocity of the solvent alone.

Tensile tests were conducted according to the procedure specified in ASTM D882, and TG and DSC were measured by using TGA-50 and DSC-50 (both of them are the products of Shimatzu Seisakusho K.K.), respectively.

Infra-red absorption spectra was measured by the KBr disc method or directly on the film itself.

A mixture of phenol and 4-methoxy phenol 7:3 (weight ratio) is called "M solution," and a mixture of phenol and 2,6-dimethyl phenol 6:4 (weight ratio) is called "X solution."

EXAMPLE 1

An agitator was mounted in a 500 ml three-necked flask and a cooling condenser was mounted above a trap equipped with a stopcock so that nitrogen gas could flow through the silica gel. 32.222 g (100 millimols) Benzophenone tetracarboxylic dianhydride $C_{17}H_6O_7$ ("BTDA," a product of Chemie Linz G.m.b.H., Austria), 43.24 g (100 millimols) bis[4-(4-aminophenoxy)-phenyl] sulfone $C_{24}H_{20}N_2O_4S$ (product of Wakayama Seika Kogyo K.K.), 260 g M solution, 10 g (100 millimols) pyridine and 15 ml toluene were added in the three-necked flask.

They were heated and agitated under a stream of nitrogen gas at 80° C. for 30 minutes, at 150° C. for 1 hour, and then at 190° C. for 7 hours (agitation speed = 400 rpm). Since the formed water boiled azeotropically with the toluene and accumulated in the trap, this water/toluene mixture was removed. Toluene was removed after no more formation of water was noted during the course of the reaction. Thus, a viscous polyimide-containing solution was obtained.

When this solution was poured into excess methanol and agitated vigorously by means of a commercial mixer, a yellow polyimide powder was obtained. This was filtered under suction, washed thoroughly with methanol, air-dried, and then dried under reduced pressure at 150° C. Polyimide powder 70.1 g (quantitative) was thus obtained.

The polyimide reaction mixture was cast on a sheet of glass plate, and it was heated and dried at 140°–160° C. in a stream of air flow, to form a polyimide film.

According to the result of an IR determination of the polyimide powder, absorption peaks of imide carboxylic acid were noticed at 1779 and 1724 cm$^{-1}$, and characteristic absorption peaks of polyimide were noticed at 1376 and 742 cm$^{-1}$.

The decomposition point, determined by TG analysis, was 550° C.

EXAMPLE 2

32.222 g (100 millimols) Commercial BTDA, 41.04 g (100 millimols) 2,2'-bis[4-(4-aminophenoxy)phenyl]propane, 260 g X solution, 10 g pyridine, and 10 ml toluene were added to a three-necked flask identical to that used in Example 1.

While introducing a stream of nitrogen gas, they were heated and agitated (400 rpm) at 80° C. for 30 minutes, then at 150° C. for 1 hour, and finally at 190° C. for 7 hours.

The resulting viscous solution was added to 1 liter of methanol and agitated vigorously by means of a commercial mixer, and thus a yellow powder was obtained. This powder was filtered by suction, washed thoroughly with methanol, air-dried, and then dried at 140° C. under a reduced pressure. A polyimide 46.8 g was thus obtained.

According to IR analysis, characteristic absorption peaks of polyimide were noticed at 1780, 1725, 1378 and 757 cm$^{-1}$. The thermal decomposition temperature, determined by TG analysis, was 485° C.

EXAMPLE 3

32.22 g (100 millimols) BTDA, 34.44 g (100 millimols) 4,4'-diaminobiphenyl-6,6'-disulfonic acid (commercial product), 260 g X solution, 20 g (200 millimols) pyridine, and 15 ml toluene were added to a reactor identical to that used in Example 1. After introducing a stream of nitrogen gas at room temperature, they were then heated and agitated (400 rpm) at 80° C. for 30 minutes, at 150° C. for 1 hour, and then at 190° C. for 5 hours. After azeotropic distillation of water ceased, toluene was removed. Thus, a polyimide solution was obtained.

The acquired polyimide solution was poured in methanol, to obtain 67 g of polyimide powder. An attempt to make a film from the reaction fluid failed. The 67 g of polyimide reaction fluid showed a low viscosity, and film could not be made.

According to IR analysis, characteristic absorption peaks of polyimide were noticed at 1778, 1721, 1376 and 751 cm$^{-1}$.

EXAMPLE 4

8.056 g (25 millimols) BTDA, 6.21 g (25 millimols) 4,4'-diaminodiphenyl sulfone, 200 g M solution, and 15 ml toluene were added to a reactor identical to the one used Example 1. After introducing a stream of nitrogen gas at room temperature, they were heated and agitated (400 rpm) at 140° C. for 1 hour and then at 190° C. for 5 hours and 20 minutes. After azeotropic distillation of water ceased, toluene was removed. Thus a highly viscous polyimide composition was obtained.

This composition was poured in methanol and 14 g (quantitative) polyimide powder was obtained in the same manner as in Example 1. According to IR analysis, characteristic absorption peaks of polyimide were noticed at 1783, 1720, 1364 and 749 cm$^{-1}$. Decomposition temperature, determined by TG analysis, was 563° C.

EXAMPLE 5

8.06 g (25 millimols) BTDA, 8.71 g (25 millimols) 9,9-bis(4-aminophenyl) fluorene (product of Wakayama Seika K.K.), 200 g M solution, 5 g pyridine, and 15 ml toluene were added to a reactor identical to the one used in Example 1. They were heated and agitated at 140° C. for 70 minutes and then at 190° C. for 6 hours, in a stream of nitrogen gas. The acquired polyimide solution was poured in methanol, to obtain 15.5 g of polyimide powder.

According to IR analysis, characteristic absorption peaks of polyimide were noticed at 1779, 1721, 1371, and 721 cm The thermal decomposition temperature, by TG analysis, was 578° C.

EXAMPLE 6

16.19 g (50 millimols) BTDA, 5.46 g 2,6-diaminopyridine (product of Merck Co.) (50 millimols), 200 gX solution, resorcinol 60 g, 5 g pyridine and 15 ml toluene were added to the reactor identical to Example 1. After introducing a stream of nitrogen gas, they were heated and agitated at 140° C. for 1 hour, and then at 190° C. for 5 hours and 30 minutes. Formed water was removed by azeotropically boiling with toluene. The reaction mixture was treated with methanol in the same manner as Example 1, to obtain 20.4 g polyimide powder.

According to IR analysis, characteristic absorption peaks of polyimide were noticed at 1786, 1730, 1383 and 722 cm . Thermal decomposition temperature, by TG analysis, was 537° C.

EXAMPLE 7

8.06 g (25 millimols) BTDA, 5.00 g 4,4'-diaminodiphenyl ether (25 millimols), 300 g M solution and 90 g resorcinol were added to a reactor identical to Example 1. They were heated and agitated (400 rpm) at 140° C. for 1 hour, in nitrogen gas atmosphere. Subsequently 15 ml toluene and 5 g pyrodine were added. The mixture was heated and agitated at 190° C. for 6 hours, to obtain a polyimide composition solution. It was poured in methanol, like Example 1, and 12.6 g polyimide powder was obtained.

IR analysis gave characteristic absorption peaks of polyimide at 1779, 1719, 1376 and 756 cm$^{-1}$. Thermal decomposition temperature, based on TG analysis, was 594° C.

EXAMPLE 8

4.44 g (10 millimols) 5,5-(2,2,2-Trifluoro-1-(trifluoromethyl) ethylidene-bis-1,3-isobenzofuran dione (a product of Hechst Cellanese Co.), 4,4'-diaminodiphenol ether 2.00 g (10 millimols), 30 g M solution, 1 g pyridine and 10 ml toluene were added to a reactor identical to Example 1. After introducing a stream of nitrogen gas, they were agitated at room temperature for 1 hour, and then heated and agitated at 120° C. for 1 hour and at 180° C. for 2 hours. A clear and highly viscous polyimide composition was thus obtained.

This polyimide composition was treated with methanol in a manner similar to Example 1, and a faintly yellow polyimide powder 5.3 g was obtained.

A 15% NMP solution was prepared and the solution was cast on a sheet of glass plate, which was then heated at 85° C. for 1 hour and at 145° C. for 2 hours under a reduced pressure, to obtain a polyimide film.

IR analysis of the powder showed characteristic absorption peaks of polyimide at 1786, 1731, 1381 and 723 cm$^{-1}$. Thermal decomposition temperature by TG analysis was 534° C., and DSC analysis gave exothermic peaks at 197° and 294° C.

EXAMPLE 9

44.43 g (100 millimols) 5,5'-(2,2,2-Trifluoro-1-(trifluoromethyl) ethylidene), bis-1,3-isobenzofurandione (product of Hechst Cellanese Co.), 21.83 g (100 millimols) 4,4'-diaminodiphenyl sulfide, 8 g pyridine, 300 g M solution and 15 ml toluene were added to a reactor identical to that used Example 1. They were agitated at room temperature for 1 hour, and heated and agitated at 80° C. for 1 hour, at 160° C. for 1 hour and then at 190° C. for 11 hours in a stream of nitrogen gas, to obtain a highly viscous composition. This was poured, like Example 1, in methanol, to obtain 31.4 g polyimide powder.

0.5 G of this powder was dissolved in 100 ml NMP, and viscosity was measured at 30° C. It was $(_{inh})=1.04$. A 15% NMP solution was prepared, which was then cast on a sheet of glass plate and then heated under a reduced pressure at 85° C. for 1 hour and at 155° C. for 2 hours, to obtain a polyimide film.

IR analysis of the powder revealed characteristic absorption peaks of polyimide at 1786, 1722, 1370 and 756 cm$^{-1}$.

EXAMPLE 10

22.113 g (50 millimols) 5,5-(2,2,2-Trifluro-1-(trifluoromethyl) ethylidene)bis- furandione, 17.426 g (50 millimols) 9,9-bis(4-aminophenyl) fluorene (product of Wakayama Seika K.K.), 150 g M solution and 15 ml toluene were added to a device identical to Example 1. After introducing a stream of nitrogen gas, they were agitated at room temperature for 1 hour, and heated and agitated at 80° C. for 1 hour, at 160° C. for 1 hour and then at 180° C. for 7 hours. A viscous polyimide solution was thus obtained. Like Example 1, it was poured in methanol, and 36.9 g of polyimide powder was thus obtained.

A 0.5% NMP solution was prepared, and inherent viscosity was determined. It was 1.38.

According to IR analysis, characteristic absorption peaks of polyimide were noticed at 1786, 1723, 1371 and 722 cm$^{-1}$.

Decomposition temperature, determined by TG analysis, was 547° C.

The polyimide powder was dissolved in NMP to prepare a 15% solution which was then cast on a sheet of glass plate, and heated at 85° C. for 1 hour and then at 145° C. for 2 hours under a reduced pressure. A transparent polyimide film was thus obtained.

EXAMPLE 11

An agitator was attached to a 500 ml three-necked flask. A condenser was attached on top of the trap equipped with a stopcock, so that nitrogen gas could flow through silica gel. 7.35 g, (12 millimols) biphenyl-3,4,3',4'-tetracarboxylic dianhydride $C_{12}H_6O_6$ ("BPDA," hereinafter; a product of Ube Kosan K.K.), 10.26 g, (25 millimols) 2,2-bis[4-(4-aminophenoxy) phenyl]propane $C_{27}H_{26}N_2O_2$ (product of Wakayama Seika Kogyo K.K., and 150 g mixed solvent ("X solution," hereinafter) (melting point 8° C.) comprising phenol and 2,6-dimethyl phenol (weight ratio=6:4), 2.5 g, (25 millimols) N-methyl morpholine and 15 ml toluene were placed in the three-necked flask.

While a stream of nitrogen gas was being introduced, they were agitated for 1 hour (400 rpm) at room temperature for 1 hour and then for 1 hour at 160° C. in a silicone bath.

Since formed water boils azeotropically with toluene and accumulates in a trap, water-toluene 5 ml were removed. Subsequently, the bath temperature was raised to 190° C. and the reaction mixture was agitated for 5 hours at 400 rpm. After no more formation of water was noted, toluene was removed. Thus, a viscous polyimide-containing solution was obtained.

This solution was added into 1 liter of methanol with vigorous agitation, and yellow powder precipitated. It was collected by filtration under suction, washed thoroughly with methanol, air-dried, and then dried under a reduced pressure. Polyimide powder 16.7 g (close to theoretical value) was thus obtained.

Formed polyimide powder was made into a 0.5% NMP solution, and its inherent viscosity at 30° C. was 1.21. IR analysis of the polyimide powder showed absorption band of imide carboxylic acid at 1776 cm$^{-1}$ and 1720 cm$^{-1}$, and characteristic absorption bands of polyimide at 1376 cm$^{-1}$ and 739 cm$^{-1}$.

Glass transition temperatures: 247° C., 347° C.

Decomposition starting temperatures: 479° C. 578° C.

A 15% NMP solution was cast on a glass plate, and it was heated at 85° C. for 1 hour and then at 145° C. for 2 hours under a reduced pressure, to obtain a polyimide film (20μ). Strength at rupture was 19 kg/mm$^2$, and % elongation at rupture was 23%.

EXAMPLE 12

7.35 g (25 millimols) BPDA, 13.0 g (25 millimols) 2,2-[4-(4-aminophenoxy)phenyl]hexafluoropropane $C_{27}H_{20}F_6N_2O_2$, 130 g of a mixed solution comprising phenol and 4-methoxy phenol (weight ratio: 7:3, melting point: 15° C.) ("M solution" hereinafter), and 10 ml toluene were added to the three-necked flask shown in Example 1.

While a stream of nitrogen gas was being introduced, they were agitated (400 rpm) at 120° C. bath temperature, and then the temperature was raised to 180° C. where they were agitated for 1 hour, to obtain a viscous fluid.

This viscous fluid was added to 1 liter of methanol with vigorous agitation, to obtain yellow powder. It was collected by filtration under suction, washed with methanol thoroughly, air-dried, and dried by heating at 140° C. under a reduced pressure. The yield was 19 g (quantitative).

This powder was made into a 0.5% NMP solution, and the inherent viscosity of this solution at 30° C. was 1.38.

IR analysis gave characteristic absorptions of polyimide at 1776, 1720, 1376, and 739 cm$^{-1}$.

Thermal decomposition temperature was 555° C.

This material was made into a 15% NMP solution and the solution was cast on a glass plate, and then it was heated at 85° C. for 1 hour and then at 145° C. for 2 hours under a reduced pressure, to obtain a polyimide film (about 20μ).

Strength at rupture: 17 kg/mm$^2$

% Elongation at rupture: 13%

EXAMPLE 13

7.35 g (25 millimols) BPDA, 7.31 g (25 millimols), 1,3-bis-(4-aminophenoxy) benzene (molecular weight 292.3), 15 ml toluene, and 130 g M solution were added in the reactor shown in Example 1. While a stream of nitrogen gas was introduced, they were agitated (400 rpm) at room temperature. It was then heated at 120° C. (bath temperature) for 1 hour and then at 180° C. for 5 hours, with agitation. As azeotropic boiling of water ended, toluene was removed. Thus, a highly viscous polyimide composition was obtained.

This fluid was cast directly on a glass plate, and then heated at 85° C. for 2 hours and 150° C. for 2 hours under reduced pressure, to obtain a yellow polyimide film. Strength of this film at rupture was 13 kg/mm$^2$, and % elongation at rupture was 15%.

The polyimide composition solution was poured in excess methanol and it was agitated vigorously, to obtain polyimide powder.

The glass transition temperature Tg of this polyimide powder was 362° C. and the decomposition starting temperature was 567° C.

EXAMPLE 14

The equipment of Example 1, having a 1 liter three-necked flask, was used. 35.31 g (120 millimols) BPDA, 24.03 g (120 millimols) 4,4'-diamino diphenyl ether, and 600 g M solution were added.

They were agitated at 100° C. for 3 hours (400 rpm) in a stream of nitrogen gas, and then 26 g pyridine and 20 ml toluene were added. After agitating at 100° C. for 30 minutes, the temperature was raised to 190° C. where it was agitated for 3 hours and 30 minutes. A viscous polyimide composition fluid was thus obtained. Like Example 1, it was poured in methanol, to obtain 57.3 g polyimide powder.

Inherent viscosity of this polyimide in 0.5% p-chlorophenol solution at 50° C. was 2.51. IR analysis gave characteristic absorptions of polyimide at 1851, 1776, 1719, 1359 and 742 cm$^{-1}$.

Glass transition temperature $T_g$: 275° C.

Thermal decomposition temperature: 560° C.

The phenolic M solution was cast directly on a glass plate, and then it was heated at 85° C. for 2 hours under reduced pressure and at 145° C. for 2 hours, to obtain a polyimide film. At a thickness of 20μ, strength at rupture was 19 kg/mm², and % elongation at rupture was 60%.

EXAMPLE 15

7.35 g (25 millimols) BPDA, 6.21 g (25 millimols) 4,4'-diaminodiphenyl sulfone (molecular weight=248.3), 130 g M solution, and 15 ml toluene were added to the container of Example 1.

With nitrogen gas, they were agitated at 120° C. for 1 hour, and then at 180° C. for 6 hours. 15 ml Toluene was extracted, and then 5 g pyridine and 10 ml toluene were added, and the reaction mixture was agitated at 180° C. for 6 hours, to obtain a highly viscous, clear polyimide composition.

This was treated with methanol like Example 1, to obtain 12.5 g of yellow polyimide powder.

Inherent viscosity (30° C.) of the 0.5% NMP solution was 0.48. The 15% NMP solution was cast on a glass plate, and it was heated at 85° C. for 1 hour and then at 145° C. for 2 hours under a reduced pressure, to obtain a polyimide film (20μ).

Tensile strength at rupture: 13 kg/mm², % elongation: 15%

IR analysis of the polyimide powder gave characteristic absorptions of polyimide at 1778, 1721, 1360, and 723 cm$^{-1}$.

EXAMPLE 16

7.35 g (25 millimols) BPDA, 10 81 g (25 millimols) bis[4-(4-aminophenoxy) phenyl sulfone $C_{24}H_{20}N_2O_4S$, and 15 ml toluene were added to the equipment of Example 1.

It was heated and agitated at 120° C. for 2 hours and then at 180° C. for 3 hours, to remove the water-toluene azeotropic mixture, and then heated and agitated at 180° C. for 6 hours, to obtain a highly viscous composition.

This composition was treated with methanol like Example 1, to obtain 17.3 g polyimide powder.

As a result of thermal analysis, glass transition temperature was seen at 363° C. and decomposition temperature was seen at 543° C.

This polyimide powder was dissolved in NMP and cast on a glass plate, which was then dried by heating under reduced pressure, to obtain a polyimide film.

Strength at rupture: 14 kg/mm²
% Elongation at rupture: 5%

EXAMPLE 17

7.35 g (25 millimols)BPDA, 8.609 g (25 millimols) 4,4'-diamino-biphenyl-6,6'-disulfonic acid (molecular weight: 372.4), 15 ml toluene, 6.0 g pyridine, and 100 g X solution were added by the procedure of Example 1.

They were agitated for 1 hour at room temperature, and heated and agitated at 80° C. for 2 hours, and then at 180° C. for 5 hours in a stream of nitrogen gas.

A faintly purple composition fluid was obtained. Like Example 1, it was poured in methanol for treatment, to obtain 15.8 g polyimide powder. Formed polyimide powder was made into a 0.5% NMP solution. Inherent viscosity at 30° C. was 0.61.

In IR spectrum, absorptions of polyimide were seen at 1773, 1719, 1375 and 740 cm$^{-1}$.

Glass transition temperature: 367° C.

Decomposition starting temperature: 595° C.

EXAMPLE 18

7.35 g (25 millimols) BPDA, 5.31 g (25 millimols) 3,3'-dimethyl-4,4'-diamino-biphenyl, 150 g M solution, 15 ml toluene, 2.5 g (25 millimols) N-methyl morpholine were added, as in Example 1.

They were agitated at room temperature for 1 hour, and then heated and agitated (400 rpm) at 160° C. for 1 hour in a stream of nitrogen gas. Water-toluene was removed. Subsequently, they were heated and agitated at 190° C. for 5 hours, to obtain a viscous polyimide composition.

Like Example 1, it was treated with methanol, to obtain 13.2 g faintly yellow polyimide powder.

In IR spectrum, characteristic absorptions of polyimide were seen at 1776, 1718, 1365, and 741 cm$^{-1}$.

No apparent $T_g$

Decomposition temperature: 565° C.

EXAMPLE 19

14.711 g (50 millimols) BPDA, 18.620 g (50 millimols) 3,3'-dimethyl-4,4'-diamino-biphenyl-6,6'-disulfonic acid (molecular weight=372.4), 7.91 g pyridine, 131 g M solution and 15 ml toluene were added to the equipment of Example 1.

They were heated and agitated at 80° C. for 1 hour, at 140° C. for 2 hours and 30 minutes, and then at 190° C. for 5 hours, to obtain a highly viscous polyimide composition.

It was treated with methanol as in Example 1, to obtain 31.2 g polyimide composition.

Inherent viscosity of this powder in 0.5% NMP solution (30° C.) was 0.20.

In IR spectrum, characteristic absorptions of polyimide were seen at 1775, 1716, 1390 and 721 cm$^{-1}$.

Thermal analysis gave a glass transition point at 320° C.

EXAMPLE 20

Equipment of Example 1 was used. 7.35 g (25 millimols) BPDA, 8.71 g (25 millimols) 9,9-bis(4-amino-phenyl) fluorene (molecular weight 348.5), 130 g M solution, and 15 g toluene were added.

They were heated and agitated at 120° C. for 1 hour and then at 180° C. for 12 hours, to obtain a viscous polyimide composition.

This solution was treated with methanol as in Example 1, to obtain 14.5 g polyimide powder.

Results of IR determination showed the characteristic absorptions of polyimide at 1776, 1718, 1367, and 736 cm$^{-1}$.

During thermal analysis, decomposition started at 584° C.

EXAMPLE 21

Equipment of Example 1 was used. 7.35 g (25 millimols) BPDA, 6.21 g (25 millimols) 3,3'-diaminodiphenyl sulfone (molecular weight 248.3), 130 g M solution, and 15 ml toluene were added. They were heated and agitated at 120° C. for 1 hour and at 180° C. for 14 hours in a stream of nitrogen gas, to obtain a viscous fluid.

Like Example 1, it was treated with methanol, and 13.2 g polyimide powder was obtained.

IR determination showed the characteristic absorptions of polyamide at 1774, 1717, 1364, and 736 cm$^{-1}$.

Glass transition: None

Start of decomposition: 563° C.

What is claimed is:

1. A polyimide resin composition, where a polyimide resin containing more than 60 weight % of the repeating unit represented by the general formula (I)

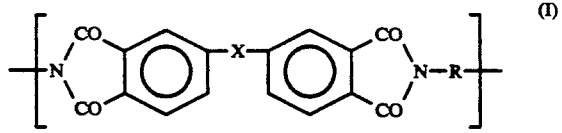

is dissolved in a solvent mixture selected from the group consisting of phenol/4-methoxy phenol at a mixing weight ratio of 4:6–7:3 and phenol/2,6-dimethyl phenol at a mixing weight ration of 4:6–6:4.

2. The polyimide resin composition of claim 1, wherein the polyimide resin has more than 90 weight % of the repeating unit represented by general formula (I).

3. A method of preparing the polyimide resin composition described in claim 1, by reacting substantially equal mols of a tetracarboxylic acid component represented by the general formula (I) or its derivative and an aromatic diamine at 120°–250° C. in a solvent mixture selected from the group consisting of phenol/4-methoxy phenol at a mixing weight ratio of 4:6–7:3 and phenol/2,6-dimethyl phenol at a mixing weight ratio of 4:6–6:4, removing the formed water as an azeotropic mixture, and carrying out the polyimidization of tetracarboxylic acid component and aromatic diamine component in one step.

4. The method of claim 3 wherein the tetracarboxylic acid component contains biphenyl-3,4,3',4'-tetracarboxylic acid as its major component, the reaction temperature is about 100°–250° C., and the solvent mixture is phenol and 4-methoxy-phenol having a weight ratio of about 4:6–7:3 so that the formed polyimide resin dissolves in the mixed solvent.

5. Method for preparing the polyimide resin composition of claim 1, wherein substantially equal mols of an aromatic diamine component and a tetracarboxylic acid component containing biphenyl-3,4,3',4'-tetracarboxylic acid as its major component are reacted at a temperature 100°–250° C. in a solvent mixture of phenol and 2,6-dimethyl-phenol having a weight ratio of about 4:6–6:4, removing the formed water as an azeotropic mixture, to polymerize and imidize the tetracarboxylic acid component and the aromatic diamine component in one step, so that the formed polyimide resin dissolves in the solvent mixture.

* * * * *